United States Patent
Kuehnel et al.

(10) Patent No.: US 7,379,955 B1
(45) Date of Patent: May 27, 2008

(54) DEVICE FOR AND METHOD OF GENERATING PSEUDO-RANDOM SEQUENCE UNIFORMLY DISTRIBUTED OVER ANY RANGE

(75) Inventors: Richard J. Kuehnel, Stuttgart (DE); Yuke Wang, Plano, TX (US)

(73) Assignee: The United States of America as represented by the Director, National Security Agency, Washington, DC (US)

( * ) Notice: Subject to any disclaimer, the term of this patent is extended or adjusted under 35 U.S.C. 154(b) by 752 days.

(21) Appl. No.: 10/808,709

(22) Filed: Mar. 16, 2004

(51) Int. Cl.
*G06F 1/02* (2006.01)

(52) U.S. Cl. .......... 708/250; 708/255; 708/256

(58) Field of Classification Search ......... 708/250–256
See application file for complete search history.

(56) References Cited

U.S. PATENT DOCUMENTS

| | | | |
|---|---|---|---|
| 4,780,840 A * | 10/1988 | Van Den Ende | 708/250 |
| 5,317,528 A | 5/1994 | Gofman | |
| 5,446,683 A * | 8/1995 | Mullen et al. | 708/256 |
| 5,864,491 A | 1/1999 | Smeets | |
| 5,871,400 A | 2/1999 | Yfantis | |
| 5,974,144 A * | 10/1999 | Brandman | 380/216 |
| 6,141,668 A | 10/2000 | Shimada | |
| 6,480,870 B1 | 11/2002 | Park | |
| 2002/0041623 A1 | 4/2002 | Umeno | |
| 2004/0005053 A1 | 1/2004 | Koshiba | |
| 2004/0028223 A1 | 2/2004 | Joye et al. | |
| 2004/0039762 A1 | 2/2004 | Hars | |

* cited by examiner

*Primary Examiner*—Lewis A. Bullock, Jr.
*Assistant Examiner*—Michael Yaary
(74) *Attorney, Agent, or Firm*—Robert D. Morelli

(57) ABSTRACT

A device for and method of generating an uncorrelated pseudo-random bit sequence by first selecting a user-definable value K. Next, factoring K+1 into m prime factors $q_1, q_2, \ldots, q_m$, where $q_1, q_2, \ldots, q_m$ are ordered from smallest value $q_1$ to largest value $q_m$. Next, generating m pseudo-random sequences $r_1, r_2, \ldots, r_m$, where each pseudo-random bit sequence $r_i$ is uniformly distributed over a range $(0, \ldots, q_i-1)$, and where $i=1, 2, \ldots, m$. Finally, generating the uncorrelated pseudo-random sequence as $R=r_1+q_1 r_2 + q_1 q_2 r_3 + \ldots + q_1 q_2 \ldots q_{m-1} r_m$.

4 Claims, 2 Drawing Sheets

DEVICE FOR AND METHOD OF GENERATING PSEUDO-RANDOM SEQUENCE UNIFORMLY DISTRIBUTED OVER ANY RANGE

FIELD OF THE INVENTION

This invention relates to electrical computer arithmetic processing and calculating, and, more particularly, to random number generation.

BACKGROUND OF THE INVENTION

Parallel computing applications such as Monte Carlo simulation and stochastic neural networks often use large numbers (e.g., hundreds or thousands) of random-number sequences. Often, a random-number sequence has a range of possible values that is convenient to implement, such as when the range of random numbers is a power of two (e.g., $2, 4, 8, \ldots, 2^n$). For example, a circuit that generates eight random binary bits (i.e., eight bits were each bit has a value of either 0 or 1) may be used to generate a random number in a range from zero to 255, or 256 possible random numbers, which is a power of two (i.e., $2^8$). This is accomplished by ordering the eight bits from a least significant bit to a most significant bit position, all of which are user-definable. Each bit position n is numbered, starting with one for the least significant bit position and incrementing to the most significant bit position. Next, a value is assigned to each bit position n (e.g., n=1, 2, ..., 8 in the present example) that is equal to the value of the bit times $2^{n-1}$. Finally, the values of the bit positions are summed to determine the value of the bit sequence.

If each bit in a sequence is equally likely to be a 0 as it is to be a 1 then every possible outcome in the sequence (e.g., 0 to 255 for an eight-bit sequence) is equally likely to occur. If this condition exists then the sequence of n bits is said to be uniformly distributed over the set of integers $\{0, 1, \ldots, 2^n-1\}$. Such a sequence may also be said to be uniformly distributed over the set of integers zero to K, where the total number of bits K+1 (i.e., its range) is a power of two.

It is also possible to generate random sequences that are uniformly distributed over a range from zero to K, where K+1 is a prime number. However, as the prime number increases, so does the size of the circuit required to implement the random-number sequence generator as compared to that of a circuit that generates a random sequence uniformly distributed over a range that is a power of two.

Space-efficient digital filters constructed using stochastic computing cannot be limited to using random sequences having ranges that are powers of two. Prime number ranges are possible, but the large size of such random sequence generators would defeat the space-efficiency of the digital filter, which is one of its primary benefits.

Prior art methods of generating random number sequences over ranges that are not a power of two or a prime number fall into two categories (1) random sequence generators that use analog and digital circuitry and (2) all-digital random sequence generators that use multiple clock cycles to compute each random sequence. Analog components are complex and are not available in many digital integrated circuit processes. Requiring multiple clock cycles per random sequence decreases the performance of the generator. Therefore, there is a need for a method of generating a random sequence that is uniformly distributed over a range that is neither limited to being a power of two nor limited to being a prime number, does not include an analog component, and does not require multiple clock cycles per generated sequence (i.e., a method that generates a random sequence in one clock cycle).

U.S. Pat. No. 5,317,528, entitled "RANDOM NUMBER GENERATOR," discloses a device for generating a random number that implements an improved linear congruential generation method. The linear congruential generation method is a method of generating a random number by selecting a prime number, determining one primitive root of the prime number, selecting a seed value, multiplying a seed value by the root of the prime number, and reducing the result modulo the prime number. The method used in U.S. Pat. No. 5,317,528 involves selecting a prime number, determining one primitive root of the prime number, selecting a seed value, multiplying a seed value or previously generated random number by the root of the prime number, adding the seed value, identifying the $m^{th}$ bit of the summation, and adding the $m^{th}$ bit to the summation to form a random number. The present invention does not use such a device or method. U.S. Pat. No. 5,317,528 is hereby incorporated by reference into the specification of the present invention.

U.S. Pat. No. 5,864,491, entitled "APPARATUS AND ASSOCIATED METHOD FOR GENERATING A PSEUDO RANDOM NUMBER," discloses a device for and method of generating a pseudo random number by summing input sequences and filtering the same using an infinite impulse response (IIR) filter. The present invention does not use such a device or method. U.S. Pat. No. 5,864,491 is hereby incorporated by reference into the specification of the present invention.

U.S. Pat. No. 5,871,400, entitled "RANDOM NUMBER GENERATOR FOR ELECTRONIC APPLICATIONS," discloses a device for and method of generating a random number by using a shift-register-based random-number generator configured to step as a primitive polynomial of degree k to generate random numbers. A second random number generator is used to store and retrieve the random numbers generated by the shift register. The present invention does not use such a device or method. U.S. Pat. No. 5,871,400 is hereby incorporated by reference into the specification of the present invention.

U.S. Pat. No. 6,141,668, entitled "PSEUDO RANDOM NUMBER GENERATING METHOD AND APPARATUS THEREFOR," discloses a device for and method of generating a pseudo random number by generating an integer that satisfies a criteria involving prime numbers, forming a product of these prime numbers, dividing the product by each prime number, and forming a pseudo random number by adding products of the binary elements of the integer, the divided prime number products, and a modular reduced value of the integer. The present invention does not use such a device or method. U.S. Pat. No. 6,141,668 is hereby incorporated by reference into the specification of the present invention.

U.S. Pat. No. 6,480,870, entitled "RANDOM NUMBER GENERATOR USING LEHMER ALGORITHM," discloses a device for and method of generating a random number by using a plurality of bit generators to produce a plurality of sum bits and a plurality of carry bits. The carry bits are converted to a three-bit number, which is then added to the sum bits to produce a random number. The present invention does not use such a device or method. U.S. Pat. No. 6,480,870 is hereby incorporated by reference into the specification of the present invention.

U.S. Pat. No. 7,099,366, entitled "PSEUDO-RANDOM NUMBER SEQUENCE OUTPUT UNIT, TRANSMITTER, RECEIVER, COMMUNICATION SYSTEM AND FILTER UNIT," discloses a device for and method of generating a pseudo random number by calculating a recursive formula using a number, prescribed positive integers, a prescribed real impulse constant, and a prescribed non-zero real constant. The present invention does not use such a device or method. U.S. Pat. No. 7,099,366 is hereby incorporated by reference into the specification of the present invention.

U.S. Pat. Appl. Pub. No. US 2004/0005053 A1, entitled "CRYPTOGRAPHICAL PSEUDO-RANDOM NUMBER GENERATION APPARATUS AND PROGRAM," discloses a device for and method of generating a pseudo random number by storing bit strings, taking the high order bits of the stored bits as an exponent, raising a value to the exponent, and using the result as the pseudo-random number. The present invention does not use such a device or method. U.S. Pat. Appl. Pub. No. US 2004/0005053 A1 is hereby incorporated by reference into the specification of the present invention.

U.S. Pat. No. 7,113,595, entitled "GENERATION OF A RANDOM NUMBER THAT IS NON-DIVISIBLE BY A SET OF PRIME NUMBERS," discloses a device for and method of generating a random number by generating a number that is co-prime with a set of prime numbers without calculating the greatest common denominator of the numbers, and testing the generated number using the Carmichael function to determine if it is non-zero. If it is equal to zero then the generated number is treated as a random number. Otherwise, updating the generated number and repeating the above-identified steps. The present invention does not use such a device or method. U.S. Pat. No. 7,113,595 is hereby incorporated by reference into the specification of the present invention.

U.S. Pat. No. 7,047,262, entitled "ENTROPY ESTIMATION AND DECIMATION FOR IMPROVING THE RANDOMNESS OF TRUE RANDOM NUMBER GENERATION," discloses a device for improving randomness in a random number generator using an entropy estimator to generate a signal indicative of the randomness of the output of a physical random number generator. The signal is processed by a decimator whose output represents a decimation of a true random number and a pseudo-random number. The present invention does not use such a device. U.S. Pat. No. 7,047,262 is hereby incorporated by reference into the specification of the present invention.

SUMMARY OF THE INVENTION

It is an object of the present invention to generate an uncorrelated pseudo-random bit sequence in a user-definable range.

It is another object of the present invention to generate an uncorrelated pseudo-random bit sequence in a user-definable range that is not limited to a power of two or a prime number.

The present invention is a device for and method of generating an uncorrelated pseudo-random bit sequence uniformly distributed over a user-definable value K, where K+1 has m prime factors $q_1, q_2, \ldots, q_m$.

The device includes an array of m−1 multipliers.

The first multiplier receives a pseudo-random bit sequence, uniformly distributed over a user-definable range, and a prime factor of K+1. If the prime factors are ordered from smallest to largest value and used accordingly, a more space efficient device of the invention results.

Each subsequent multiplier in the array has inputs for receiving a unique pseudo-random bit sequence, the prime factor(s) received by the immediately preceding multiplier in the array, and an additional prime factor. Each of the m pseudo-random bit sequences $r_i$ is uniformly distributed over a range $(0, \ldots, q_i-1)$, where $i=1, 2, \ldots, m$.

The device also includes an array of m−1 adders.

The output of each adder is connected to the first input of the adder that immediately follows in the array. The first input of the first adder receives a unique pseudo-random bit sequence. The second input of each adder is connected to the output of the multiplier that corresponds in position within their respective arrays.

The uncorrelated pseudo-random bit sequence uniformly distributed over a user-definable value K appears at the output of the last adder in the array.

The first step of the method of generating an uncorrelated pseudo-random bit sequence is selecting a user-definable value K.

The second step of the method is factoring K+1 into m prime factors $q_1, q_2, \ldots, q_m$. In the preferred embodiment, the prime factors are ordered from smallest value to largest value, and used accordingly.

The third step of the method is generating m pseudo-random bit sequences $r_1, r_2, \ldots, r_m$, where each of the m pseudo-random bit sequences $r_i$ is uniformly distributed over a range $(0, \ldots, q_i-1)$, where $i=1, 2, \ldots, m$.

The fourth, and last, step of the method is generating the uncorrelated pseudo-random sequence as $R=r_1+q_1 r_2 + q_1 q_2 r_3 + \ldots + q_1 q_2 \ldots q_{m-1} r_m$.

DETAILED DESCRIPTION

The present invention is a device for and method of generating a pseudo-random bit sequence distributed (i.e., uncorrelated) over a user-definable range that is not limited to a power of two or a prime number. Such a device and method is useful for processes such as stochastic neural networks that require large numbers (e.g., hundreds or thousands) of pseudo-random bit sequences.

Figure 1:
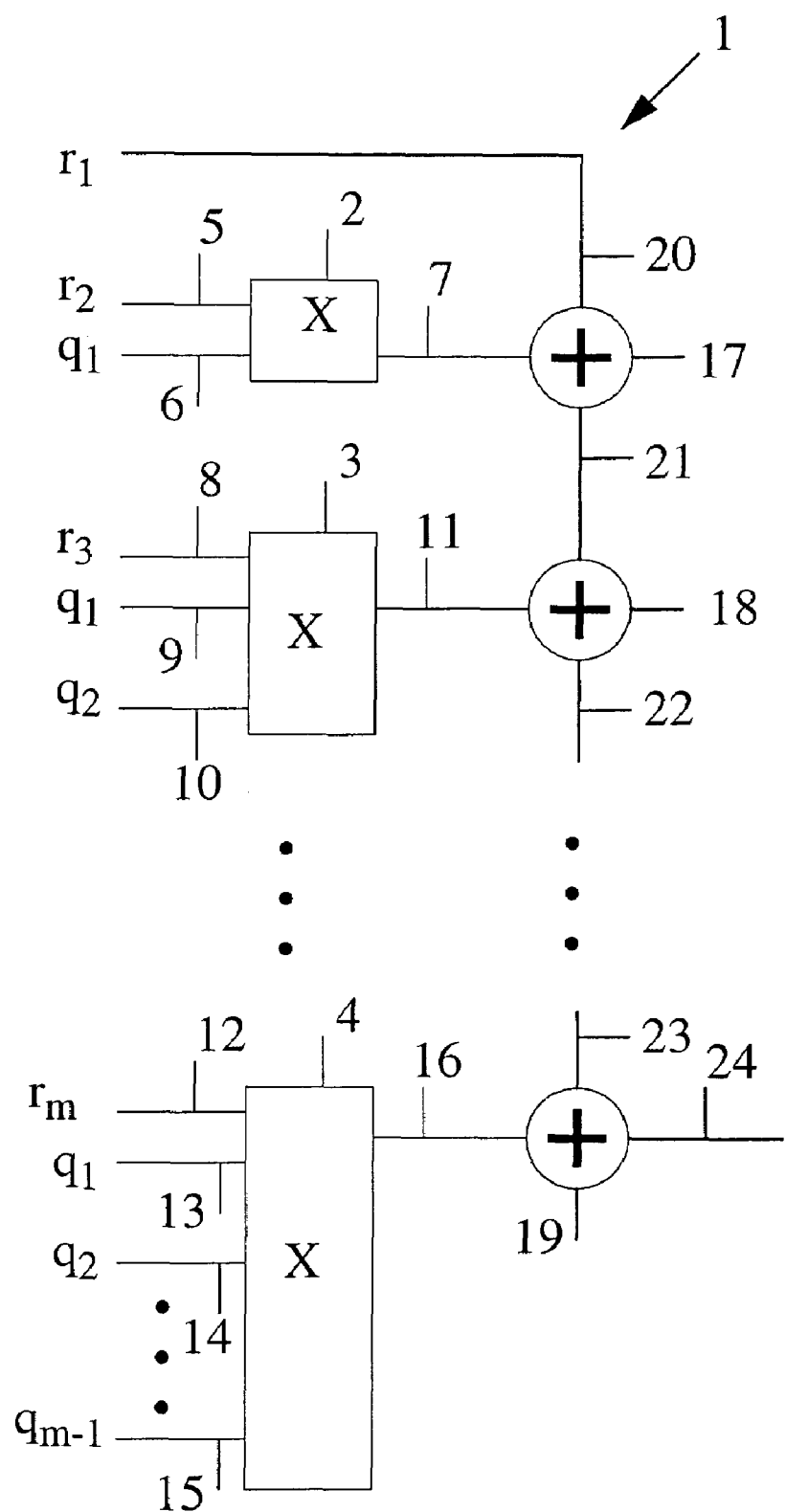
FIG. 1 is a schematic of the device of the present invention.

FIG. 1 is a schematic of the pseudo-random bit sequence generator 1 of the present invention. The pseudo-random bit sequence generator 1 includes an array of m−1 multipliers 2,3,4. The value m is based on the user-definable range of 0 to K, where K is a user-definable positive integer. K is not limited to either a power of two or a prime number. The value m is the number of prime factors $q_1, q_2, \ldots, q_m$ of K+1. In the preferred embodiment, the prime factors are ordered from smallest value to largest value. Such an ordering results in a more space efficient pseudo-random bit sequence generator 1.

The first multiplier 2 in the array has a first input 5, a second input 6, and an output 7. The first input 5 receives the second (i.e., $r_2$) of m pseudo-random sequences required by the pseudo-random bit sequence generator 1. The second input 6 receives one of the prime factors of K+1 (i.e., $q_1$). In the preferred embodiment, $q_1$ is the prime factor having the smallest value. Each of the pseudo-random bit sequences $r_i$ is uniformly distributed over a range $(0, \ldots, q_i-1)$, where $i=1, 2, \ldots, m$. Therefore, $r_2$ is uniformly distributed over a range $(0, \ldots, q_2-1)$.

Subsequent multipliers 3,4 in the array include an additional input over the immediately preceding multiplier in the array for receiving an additional prime factor not received by the preceding multiplier received. The additional input is the last input of the multiplier. That is, each subsequent multiplier includes one more input over the immediately preceding multiplier in the array for receiving another prime factor of K+1. In the preferred embodiment, the additional prime factor is the next prime factor in the list of prime factors order from smallest value to largest value. The first input of each subsequent multiplier receives another of the m pseudo-random bit sequences. The other inputs of each subsequent multiplier, other than the first and last inputs, receive all of the prime factors received by the immediately preceding multiplier in the array.

In accordance with the description above, the second multiplier 3 in the array has a first input 8, a second input 9, a third input 10, and an output 11. The first input 8 receives the third of the in pseudo-random sequences (i.e., $r_3$), where $r_3$ is uniformly distributed over a range $(0, \ldots, q_3-1)$. The second input 9 receives the same prime factor (i.e., $q_1$) received by the immediately preceding multiplier in the array (i.e., the first multiplier 2). The third input 10 is the additional input over the immediately preceding multiplier in the array (i.e., the first multiplier 2) and receives another of the prime factors (i.e., $q_2$). In the preferred embodiment, the prime factor received is the next highest valued prime factor in an ordered list of prime factors according to value.

The third through the m-2$^{th}$ multiplier (not shown) are configured in accordance with the pattern described above.

The last, or m-1$^{th}$, multiplier 4 in the array has a first input 12, a second through m inputs 13,14, 15, and an output 16. The first input 12 receives the last of the m pseudo-random sequences (i.e., $r_m$), where $r_m$ is uniformly distributed over a range $(0, \ldots, q_m-1)$. The second through m-1 inputs 13, 14, . . . receive the same prime factors (i.e., $q_1, q_2, \ldots, q_{m-2}$) received by the immediately preceding multiplier (not shown) in the array (i.e., the m-2$^{th}$ multiplier). The m$^{th}$ input 15 is the additional input over the immediately preceding multiplier in the array (i.e., the m-2$^{th}$ multiplier) and receives the next prime factor (i.e., $q_{m-1}$). In the preferred embodiment, the prime factor received is the next prime factor in the list of prime factors ordered from smallest value to largest value. The prime factor received is the next to last prime factor. The last prime factor is not used in the present invention.

The pseudo-random bit sequence generator 1 includes an array of m-1 multipliers 17, 18, 19. The adders add arithmetically, not modulo. The adders are connected in daisy-chain fashion, where the output of a preceding adder is connected to the first input of the immediately following adder. The first input of the first adder in the array receives the first of the m pseudo-random sequences ($r_1$), where $r_1$ is uniformly distributed over a range $(0, \ldots, q_1-1)$. The second input of an adder is connected to the output of a multiplier, where the adder and the multiplier to which it is connected correspond with respect to their positions in their respective arrays. The uncorrelated pseudo-random bit sequence of the present invention appears at the output of the last adder in the array.

Accordingly, the first adder 17 has a first input 20, a second input, and an output 21. The first input 20 receives the first of the m pseudo-random sequences ($r_1$). The second input is connected to the output 7 of the first multiplier 2.

The second adder 18 has a first input, a second input, and an output 22. The first input is connected to the output 21 of the first adder 17. The second input is connected to the output 11 of the second multiplier 3.

The third through the m-2$^{th}$ adders (not shown) are configured in accordance with the pattern described above.

The m-1$^{th}$ adder 19 has a first input 23, a second input, and an output 24. The first input 23 is connected to the output of the m-2$^{th}$ adder (not shown). The second input is connected to the output 16 of the m-1$^{th}$ multiplier 4. The uncorrelated pseudo-random bit sequence of the present invention appears at the output 24 of the m-1$^{th}$ adder.

Figure 2:
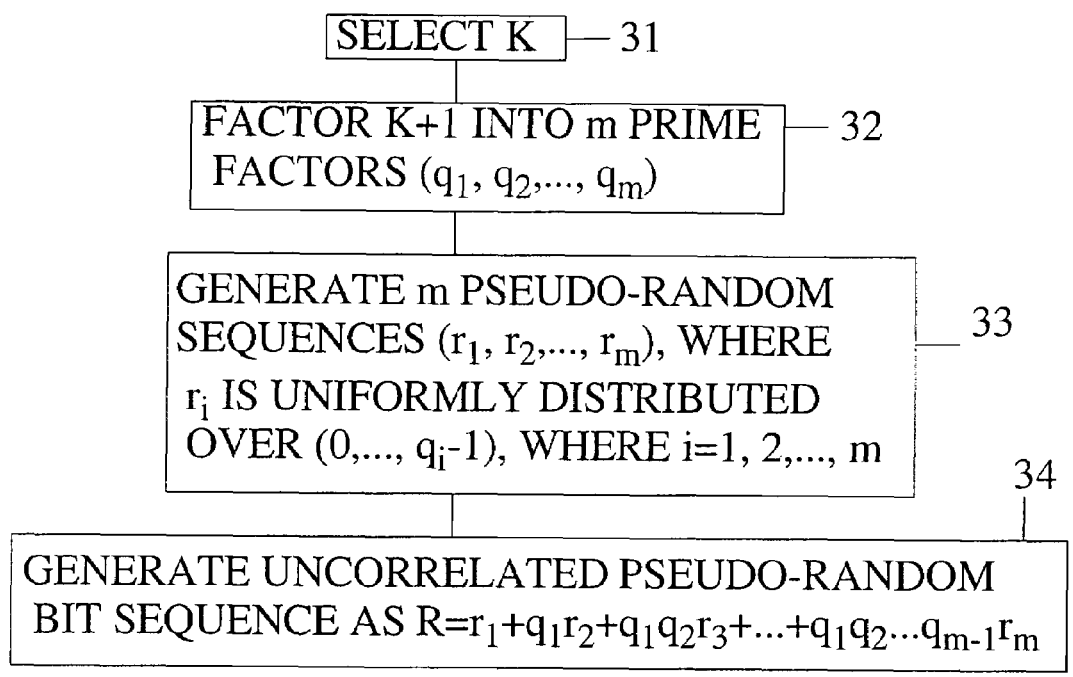
FIG. 2 is a list of steps of the method of the present invention.

FIG. 2 is a list of the steps of the present method. The first step 31 of the method is selecting a user-definable value K, where K is a positive integer.

The second step 32 of the method is factoring K+1 into m prime factors $q_1, q_2, \ldots, q_m$. In the preferred embodiment, the prime factors are ordered from smallest value to largest value.

The third step 33 of the method is generating m pseudo-random bit sequences $r_1, r_2, \ldots, r_m$, where each pseudo-random bit sequence $r_i$ is uniformly distributed over a range $(0, \ldots, q_i-1)$, and where $i=1, 2, \ldots, m$.

The fourth, and last, step 34 of the method is generating the uncorrelated pseudo-random sequence as $R = r_1 + q_1 r_2 + q_1 q_2 r_3 + \ldots + q_1 q_2 \ldots q_{m-1} r_m$. In the preferred embodiment, the prime factors $q_1, q_2, \ldots, q_m$ are in order of value from smallest to largest. In addition, $r_1$ is uniformly distributed over a range $(0, \ldots, q_1-1)$; $r_2$ is uniformly distributed over a range $(0, \ldots, q_2-1)$; $r_3$ is uniformly distributed over a range $(0, \ldots, q_3-1)$; and so on to where $r_m$ is uniformly distributed over a range $(0, \ldots, q_m-1)$.

What is claimed is:

1. A device for generating an uncorrelated pseudo-random bit sequence uniformly distributed over a user-definable value K, where K+1 has m prime factors $q_1, q_2, \ldots, q_m$, comprising:
   (a) an array of m-1 multipliers, where each multiplier is numbered in accordance to the multiplier's order in the array, where each multiplier has a first input for receiving a unique pseudo-random bit sequence, where each pseudo-random bit sequence $r_i$ is uniformly distributed over a range $(0, \ldots, q_i-1)$, where $i=1, 2, \ldots, m$, where each multiplier has additional inputs equal to the multiplier's order number for receiving as many of the m prime factors as possible starting with $q_1$, and where each of the multipliers has an output; and
   (b) an array of m-1 adders, where each adder is numbered in accordance with the adder's order in the array; where each adder has a first input, a second input, and an output; where the first input of the first adder in the array receives a unique pseudo-random bit sequence, where the adders are connected in daisy-chain fashion so that the output of each adder is connected to the first input of the adder that immediately follows in the array, and where the second inputs of the adders are connected to the outputs multipliers that correspond in number within the respective arrays.

2. The device of claim 1, wherein $q_1, q_2, \ldots, q_m$ are ordered from smallest value to largest value.

3. A method of generating an uncorrelated pseudo-random bit sequence, comprising the steps of:
   (a) selecting a user-definable value K, where K is a positive integer;
   (b) factoring K+1 into m prime factors $q_1, q_2, \ldots, q_m$;

(c) generating m pseudo-random sequences $r_1, r_2, \ldots, r_m$, where each pseudo-random bit sequence $r_i$ is uniformly distributed over a range $(0, \ldots, q_i-1)$, and where $i=1, 2, \ldots, m$; and (d) generating the uncorrelated pseudo-random sequence as $$R = r_1 + q_1 r_2 + q_1 q_2 r_3 + \ldots + q_1 q_2 \ldots q_{m-1} r_m,$$

where an array of m−1 multipliers is used to accomplish the multiplications in R, where each multiplier is numbered in accordance to the multiplier's order in the array, where each multiplier has a first input for receiving a unique pseudo-random bit sequence, where each pseudo-random bit sequence $r_i$ is uniformly distributed over a range $(0, \ldots, q_i-1)$, where $i=1, 2, \ldots, m$, where each multiplier has additional inputs equal to the multiplier's order number for receiving as many of the m prime factors as possible starting with $q_1$, and where each of the multipliers has an output, and where an array of m−1 adders is used to accomplish the additions in R, where each adder is numbered in accordance with the adder's order in the array; where each adder has a first input, a second input, and an output; where the first input of the first adder in the array receives a unique pseudo-random bit sequence, where the adders are connected in daisy-chain fashion so that the output of each adder is connected to the first input of the adder that immediately follows in the array, and where the second inputs of the adders are connected to the outputs multipliers that correspond in number within the respective arrays.

4. The method of claim 3, wherein the step of factoring K+1 into m prime factors $q_1, q_2, \ldots, q_m$, is comprised of factoring K+1 into m prime factors $q_1, q_2, \ldots, q_m$ where $q_1, q_2, \ldots, q_m$ are ordered from smallest value $q_1$ to largest value $q_m$.

* * * * *